(12) United States Patent
Ikeda et al.

(10) Patent No.: US 10,971,853 B2
(45) Date of Patent: Apr. 6, 2021

(54) BUS BAR HOLDING STRUCTURE, ELECTRICAL CONNECTION BOX AND WIRE HARNESS

(71) Applicant: YAZAKI CORPORATION, Tokyo (JP)

(72) Inventors: Tatsuhiko Ikeda, Makinohara (JP); Takaaki Kakimi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/596,714

(22) Filed: Oct. 8, 2019

(65) Prior Publication Data

US 2020/0153151 A1 May 14, 2020

(30) Foreign Application Priority Data

Nov. 12, 2018 (JP) .............................. JP2018-211953

(51) Int. Cl.
| | | |
|---|---|---|
| *H01R 13/518* | (2006.01) | |
| *H02G 3/16* | (2006.01) | |
| *H02G 3/08* | (2006.01) | |
| *B60R 16/023* | (2006.01) | |
| *H01R 9/24* | (2006.01) | |
| *B60R 16/02* | (2006.01) | |
| *H01R 13/66* | (2006.01) | |

(52) U.S. Cl.
CPC ....... *H01R 13/518* (2013.01); *B60R 16/0207* (2013.01); *B60R 16/0238* (2013.01); *H01R 9/2458* (2013.01); *H01R 13/66* (2013.01); *H02G 3/081* (2013.01); *H02G 3/16* (2013.01)

(58) Field of Classification Search
CPC ............ B60R 16/0207; B60R 16/0238; H01R 13/518; H01R 9/2458; H01R 13/66; H02G 3/018; H02G 3/16
USPC ......................................................... 439/76.2
See application file for complete search history.

(56) References Cited

U.S. PATENT DOCUMENTS

| | | | |
|---|---|---|---|
| 6,270,361 B1 * | 8/2001 | Onizuka ................ | H01R 9/226 439/76.2 |
| 6,922,331 B2 * | 7/2005 | Ikeda ..................... | H01R 9/226 361/624 |
| 7,785,116 B2 * | 8/2010 | Akahori ............. | B60R 16/0238 439/76.2 |

(Continued)

FOREIGN PATENT DOCUMENTS

| | | |
|---|---|---|
| JP | 2004-194432 A | 7/2004 |
| JP | 2018-64366 A | 4/2018 |

*Primary Examiner* — Peter G Leigh
(74) *Attorney, Agent, or Firm* — Kenealy Vaidya LLP (57) ABSTRACT

A bus bar holding structure includes a resin block main body, a first bus bar having a protruding portion, and a second bus bar. The resin block main body includes a bus bar assembling portion having a groove portion. The first bus bar and the second bus bar are accommodated in the bus bar assembling portion such that first side portions of the first bus bar and the second bus bar are located on a bottom side of the groove portion and second side portions of the first bus bar and the second bus bar are located on an opening side of the groove portion. The second bus bar is sandwiched between the second bus bar and a bottom of the groove portion when the first bus bar and the second bus bar are accommodated in the bus bar assembling portion.

4 Claims, 8 Drawing Sheets

(56) References Cited

U.S. PATENT DOCUMENTS

| | | | | |
|---|---|---|---|---|
| 8,257,097 B2* | 9/2012 | Kawaguchi | ............ | H05K 7/026 |
| | | | | 439/76.2 |
| 8,299,360 B2* | 10/2012 | Sato | ........................ | H01R 25/00 |
| | | | | 174/68.2 |
| 8,641,430 B2* | 2/2014 | I | ............................ | H05K 7/026 |
| | | | | 439/76.2 |
| 8,692,418 B2* | 4/2014 | Ikeda | .................. | B60R 16/0238 |
| | | | | 307/150 |
| 9,106,010 B2* | 8/2015 | Jimbo | .................. | H01R 13/595 |
| 9,685,715 B2* | 6/2017 | Yamauchi | ......... | H01M 8/04574 |
| 9,981,618 B2* | 5/2018 | Kawaguchi | .............. | H05K 7/06 |
| 2005/0153583 A1* | 7/2005 | Kawamura | .......... | H01R 9/2458 |
| | | | | 439/76.2 |
| 2009/0023345 A1* | 1/2009 | Matsumoto | .......... | H01R 25/162 |
| | | | | 439/720 |
| 2012/0064741 A1* | 3/2012 | Kawaguchi | .......... | H05K 5/0026 |
| | | | | 439/76.2 |
| 2014/0170868 A1* | 6/2014 | Komiya | ............. | B60R 16/0238 |
| | | | | 439/76.2 |
| 2018/0097416 A1* | 4/2018 | Dang | .................... | H02K 3/505 |

* cited by examiner

BUS BAR HOLDING STRUCTURE, ELECTRICAL CONNECTION BOX AND WIRE HARNESS

CROSS REFERENCE TO RELATED APPLICATIONS

This application is based on Japanese Patent Application (No. 2018-211953) filed on Nov. 12, 2018, the contents of which are incorporated herein by reference.

BACKGROUND OF THE INVENTION

1. Field of the Invention

The present invention relates to a bus bar holding structure employed in an electronic component block. The present invention also relates to an electrical connection box including an electronic component block. The present invention further relates to a wire harness including an electrical connection box at an end portion thereof.

2. Background Art

An electrical connection box mounted on an automobile includes an electronic component block and a housing that accommodates the electronic component block (for example, see JP-A-2018-64366). The housing includes a frame whose upper and lower sides are opened, an upper cover that covers an upper opening of the frame, and a lower cover that covers a lower opening of the frame. Bus bar assembling portions are formed in a resin block main body constituting the electronic component block. The bus bar assembling portion is formed as an assembling portion of a bus bar. The bus bar assembling portion includes a bus bar accommodating groove having a groove shape as viewed from a lower surface side of the block main body. A bus bar locking portion is formed in the bus bar assembling portion so that the bus bar does not fall off. The bus bar includes a bus bar main body accommodated in the bus bar accommodating groove, and electrical connection portions continuous with the bus bar main body. The electrical connection portions are disposed and formed in alignment with a plurality of cavities in the block main body. The electrical connection portions are disposed and formed at both ends of the bus bar main body in a longitudinal direction.

In the related art, the bus bar locking portion is formed in the bus bar assembling portion so that the bus bar does not fall off. However, the bus bar locking portion is difficult to form in some cases due to space relationship. If the bus bar locking portion cannot be formed at an appropriate position, rattling of the electrical connection portion may occur in the bus bar after assembling. If the rattling is large, the electrical connection may be affected.

The present invention has been made in view of the above circumstances, and an object thereof is to provide a bus bar holding structure capable of preventing rattling. Another object of the present invention is to provide an electrical connection box or a wire harness that employs the bus bar holding structure.

According to a first aspect of the present invention made to solve the above problems, there is provided a bus bar holding structure including a resin block main body for an electronic component block, a first bus bar having a protruding portion, and a second bus bar. The resin block main body includes a bus bar assembling portion having a groove portion. The first bus bar and the second bus bar are accommodated in the bus bar assembling portion such that first side portions of the first bus bar and the second bus bar are located on a bottom side of the groove portion and second side portions of the first bus bar and the second bus bar are located on an opening side of the groove portion. The second bus bar is sandwiched between the second bus bar and a bottom of the groove portion when the first bus bar and the second bus bar are accommodated in the bus bar assembling portion.

According to the present invention having the feature of the first aspect, the second bus bar is sandwiched between the protruding portion of the first bus bar and the bottom of the groove portion of the bus bar assembling portion, so that rattling of the second bus bar can be prevented. According to the present invention, rattling does not occur when the protruding portion is in contact with the second bus bar, and can be at most prevented by a clearance between the protruding portion and the second bus bar.

According to a second aspect of the present invention, in the bus bar holding structure according to the first aspect, the protruding portion extends toward the opening of the groove portion.

According to the present invention having the feature of the second aspect, the protruding portion that is lengthened and enlarged can be utilized as a portion for heat dissipation. In other words, the protruding portion can have a function as a heat dissipating portion.

According to a third aspect of the present invention, in the bus bar holding structure according to the first or second aspect, a bus bar locking portion that locks the second side portion of the first bus bar is provided on the bus bar assembling portion, and the bus bar locking portion is disposed in a vicinity of the protruding portion.

According to the present invention having the feature of the third aspect, since the bus bar locking portion is formed to hold the first bus bar, the protruding portion in vicinity of the holding portion can reliably prevent rattling of the second bus bar.

According to a fourth aspect of the present invention made to solve the above problems, there is provided an electrical connection box including: an electronic component block that includes the bus bar holding structure according to any one of the first, second or third aspects, and a housing that accommodates the electronic component block.

According to the present invention having the feature of the fourth aspect, a better electrical connection box can be provided since the electronic component block having the structure that prevents rattling of the bus bar is provided.

According to a fifth aspect of the present invention made to solve the above problems, there is provided a wire harness including: a wire harness body whose end portion is connected to the electrical connection box according to the fourth aspect. The wire harness body is routed in an automobile.

According to the present invention having the feature of the fifth aspect, a better wire harness can be provided since the electrical connection box having the structure for preventing rattling of the bus bar is provided.

According to the bus bar holding structure of the present invention, the second bus bar that may cause rattling is sandwiched between the protruding portion of the first bus bar and the bottom of the groove portion of the bus bar assembling portion, so that rattling of the second bus bar can be prevented. In addition, according to the electrical connection box and the wire harness of the present invention, a better product can be provided due to the bus bar holding structure having the above effect.

DESCRIPTION OF EMBODIMENTS

A wire harness routed in an automobile includes an electrical connection box at a terminal thereof. The electrical connection box includes an electronic component block in which a plurality of electronic components are assembled, and a housing to which the electrical component block is assembled. A bus bar assembling portion having a groove shaped portion is formed in a resin block main body constituting the electronic component block. A first bus bar and a second bus bar that may cause rattling are accommodated in the bus bar assembling portion such that a first side portion is located on a bottom side of the groove portion and the second side portion is located on the opening side of the groove portion. A protruding portion is formed in the first bus bar so as to sandwich the second bus bar with a bottom of a groove portion of the bus bar assembling portion.

Embodiment

Figure 1:
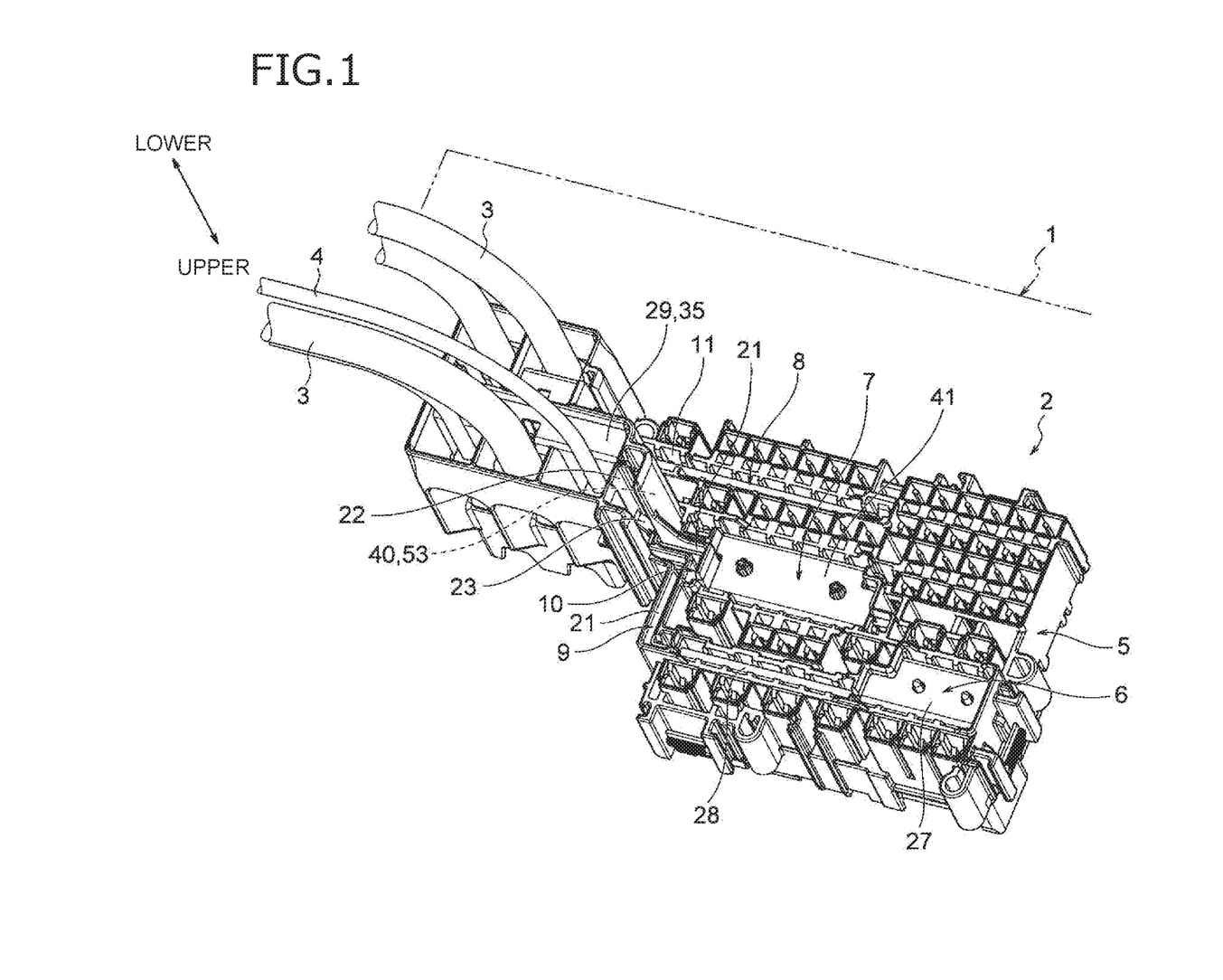
FIG. 1 is a perspective view (a perspective view as viewed from a bottom side) showing an embodiment of an electronic component block having a bus bar holding structure according to the present invention.
Figure 2:
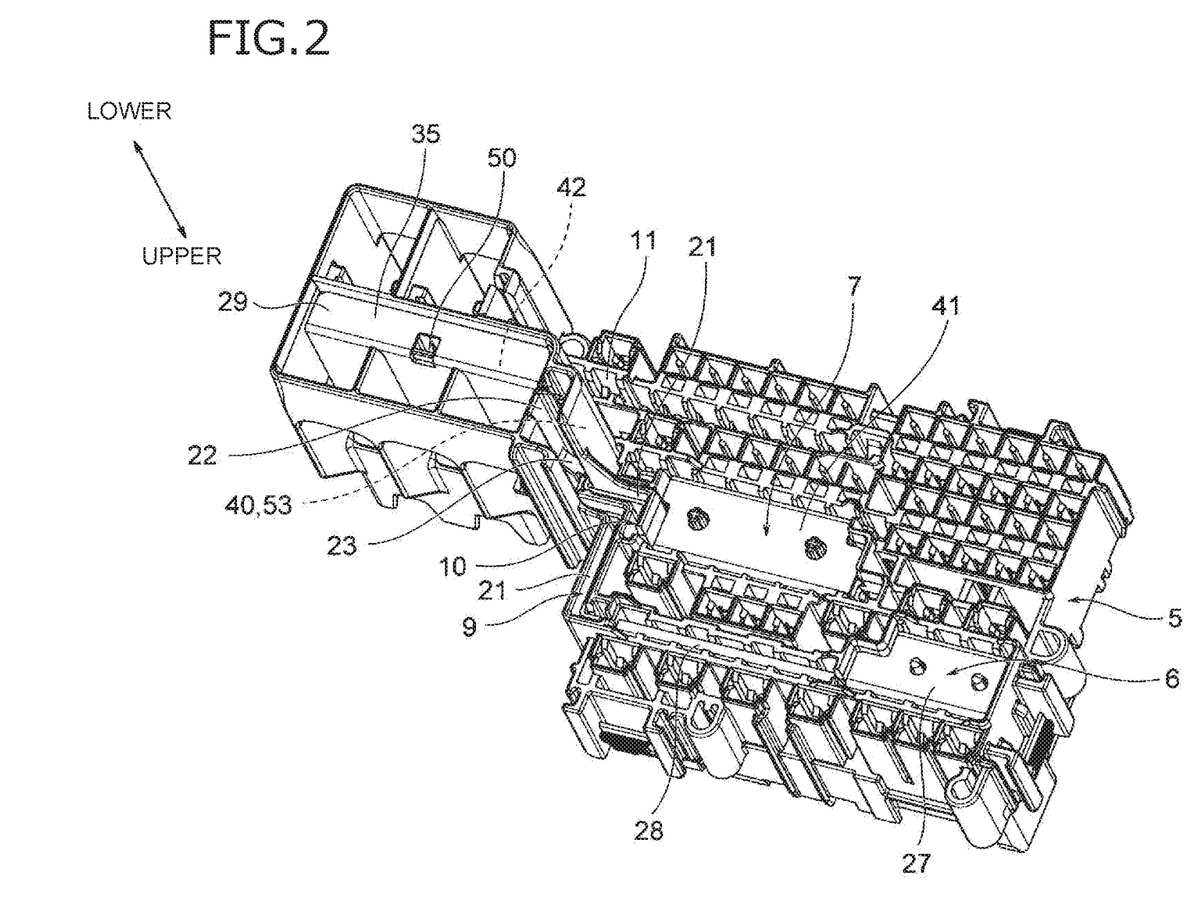
FIG. 2 is a perspective view (a perspective view as viewed from the bottom side) showing a state in which a first bus bar and a second bus bar are assembled to a block main body.
Figure 3:
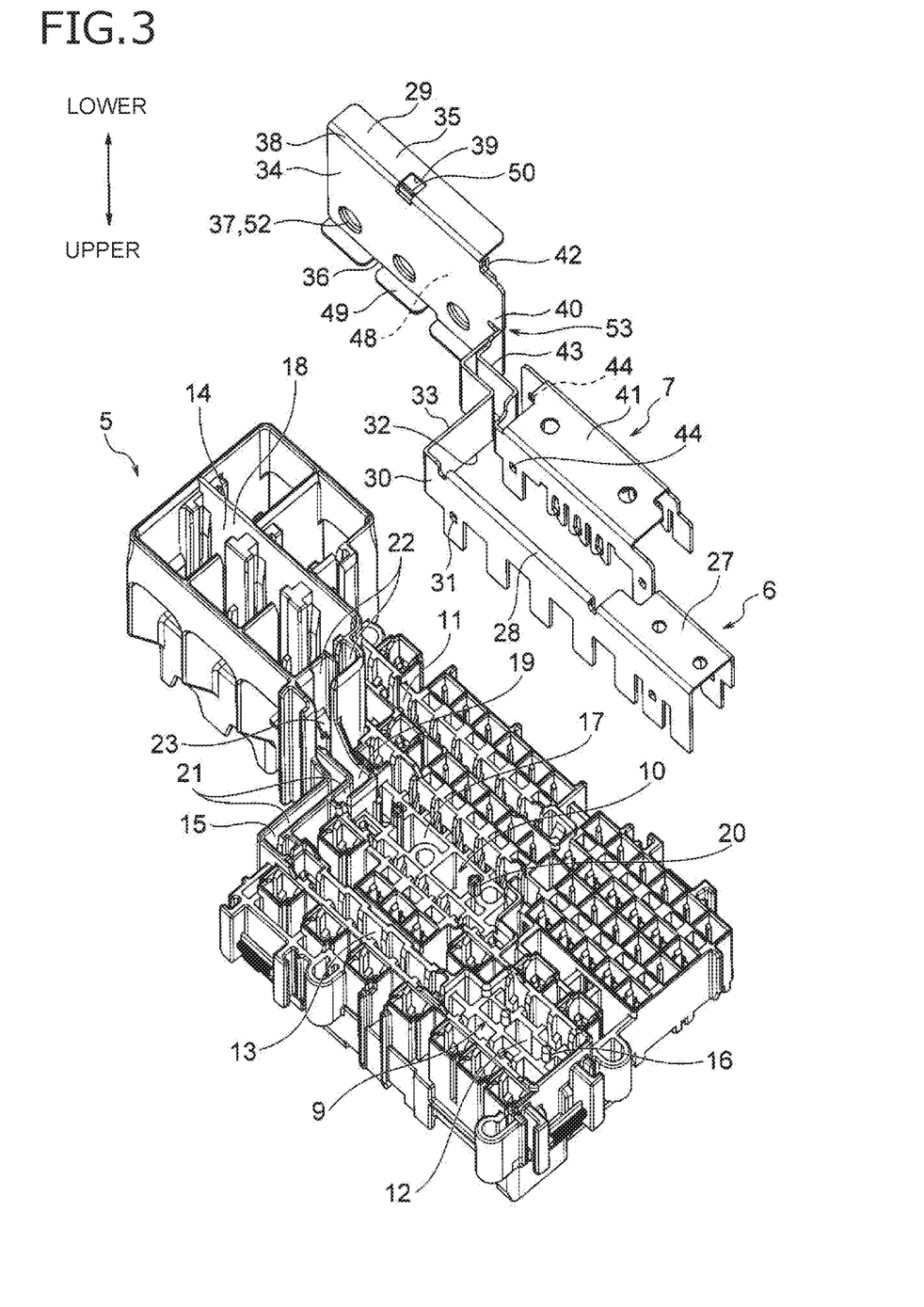
FIG. 3 is an exploded perspective view of a configuration in FIG. 2.
Figure 4:
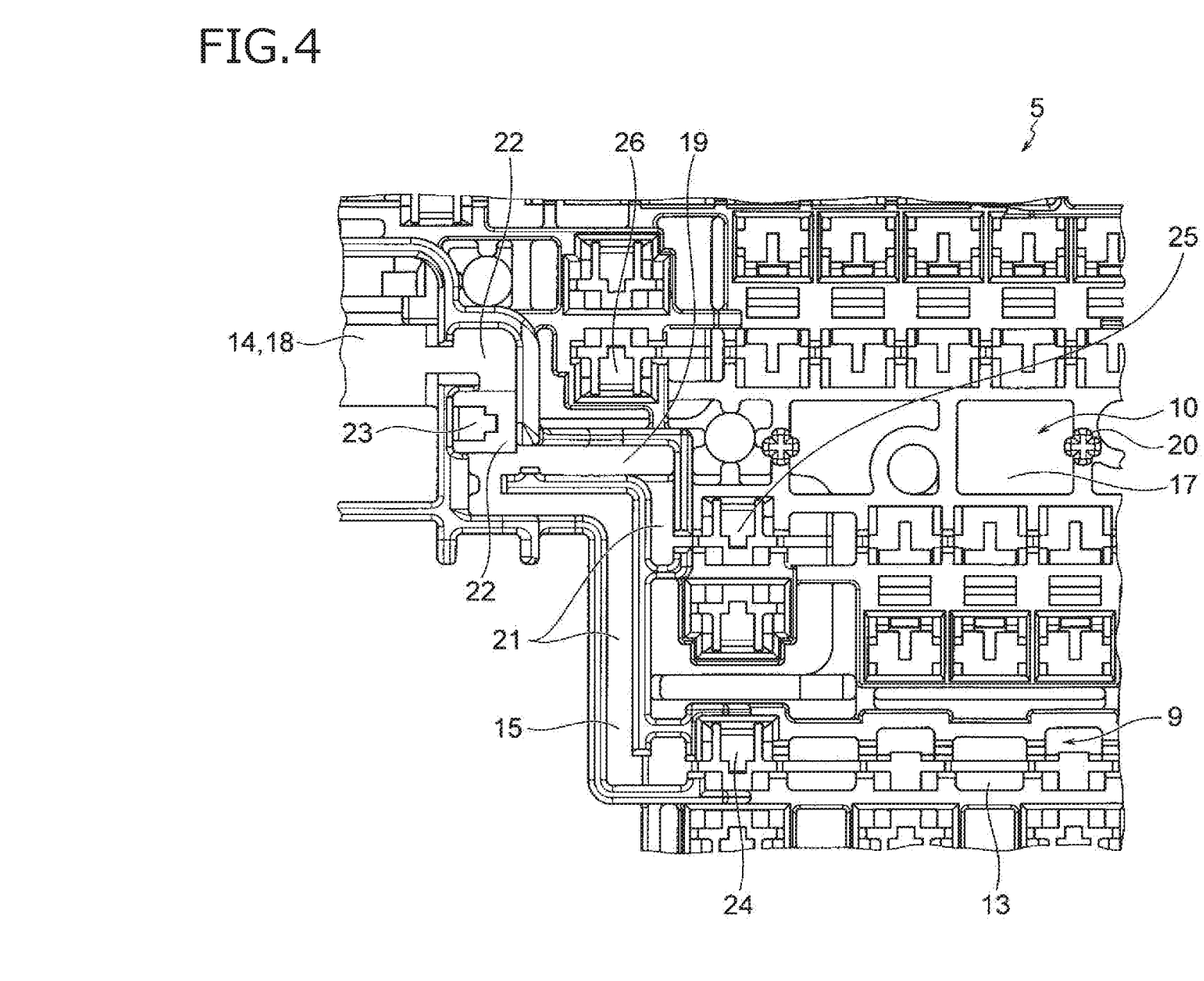
FIG. 4 is a bottom view showing a bus bar accommodating groove.
Figure 5:
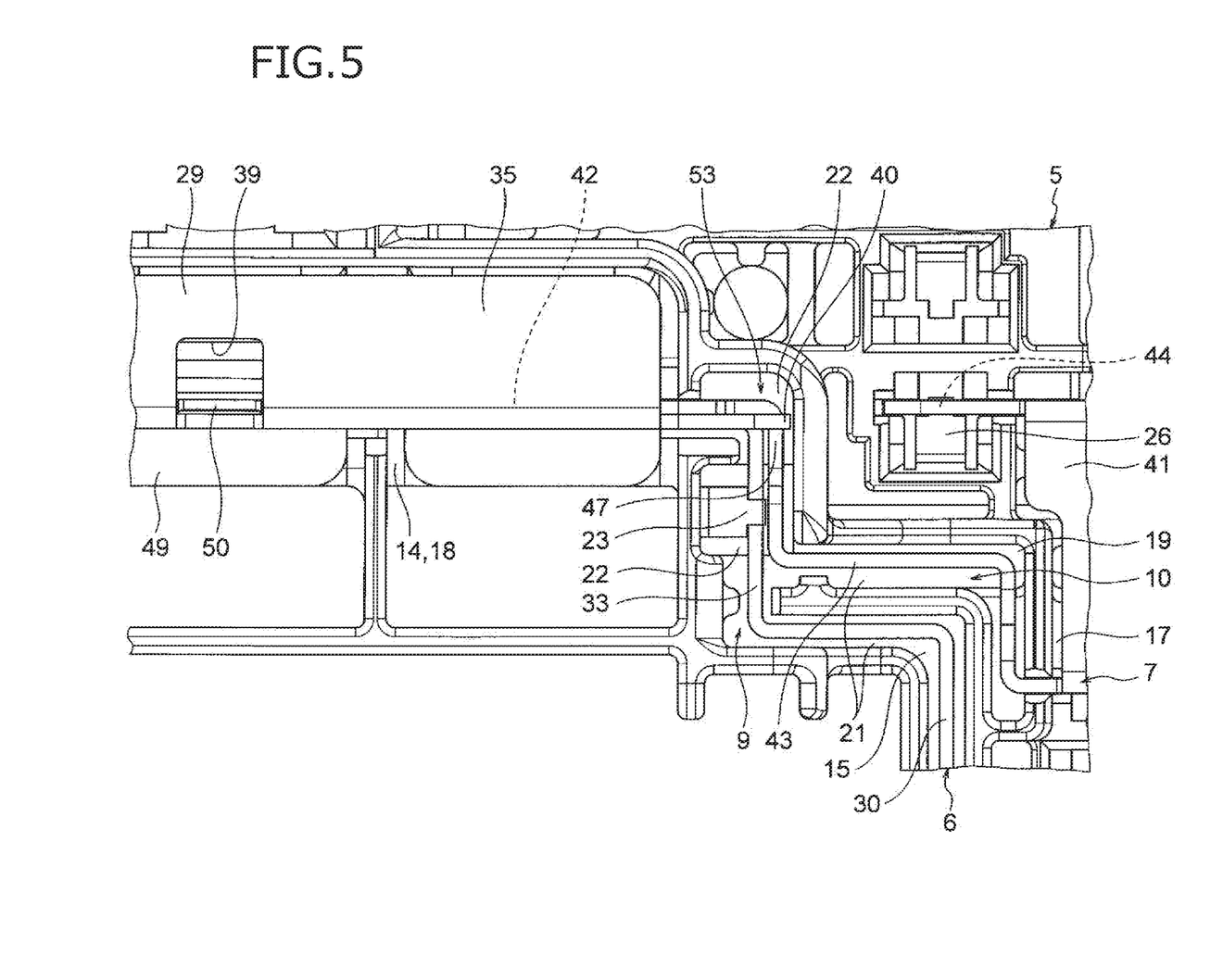
FIG. 5 is a bottom view showing a main part of the bus bar holding structure.
Figure 6:
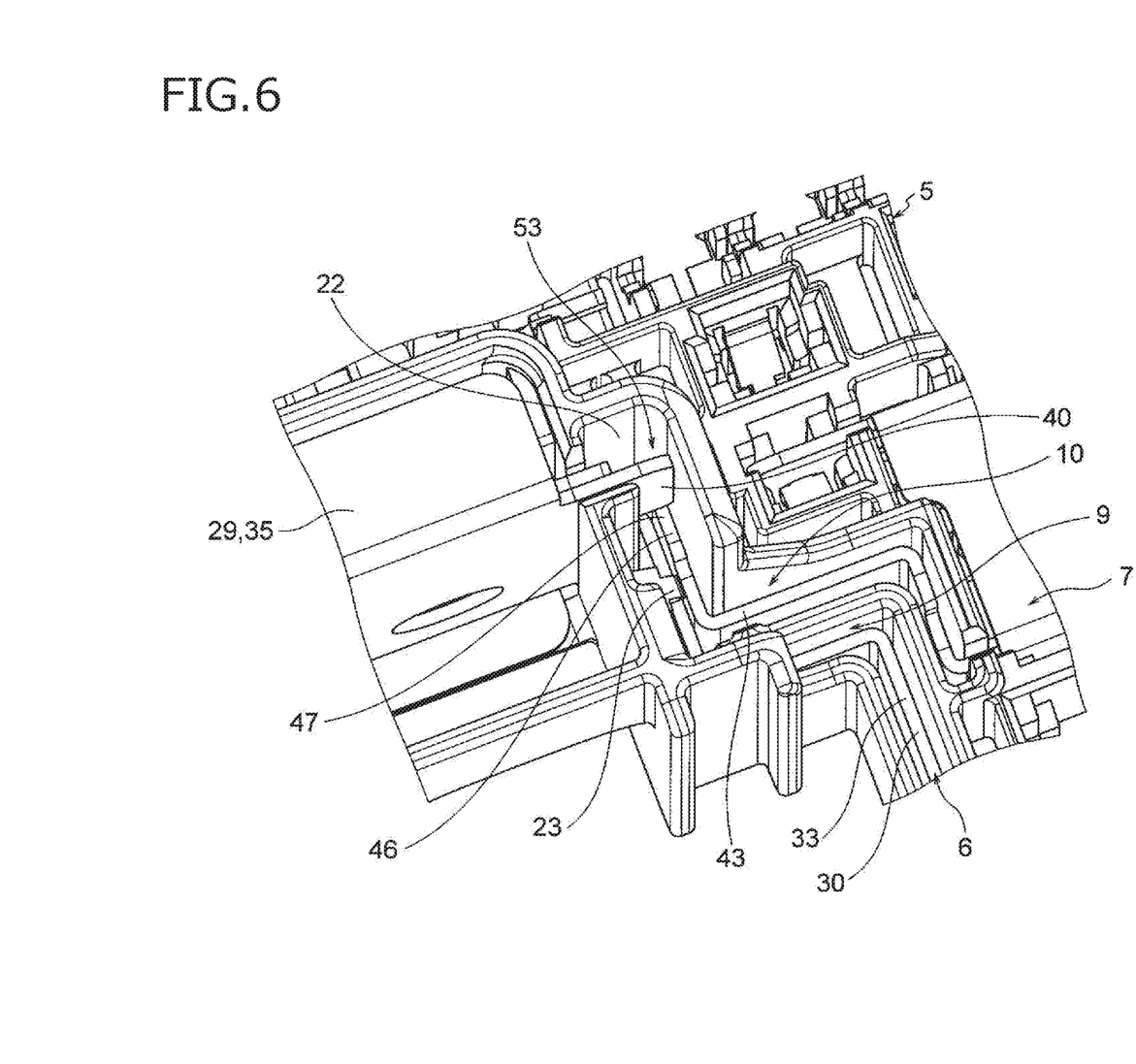
FIG. 6 is a perspective view showing the main part of the bus bar holding structure.
Figure 7:
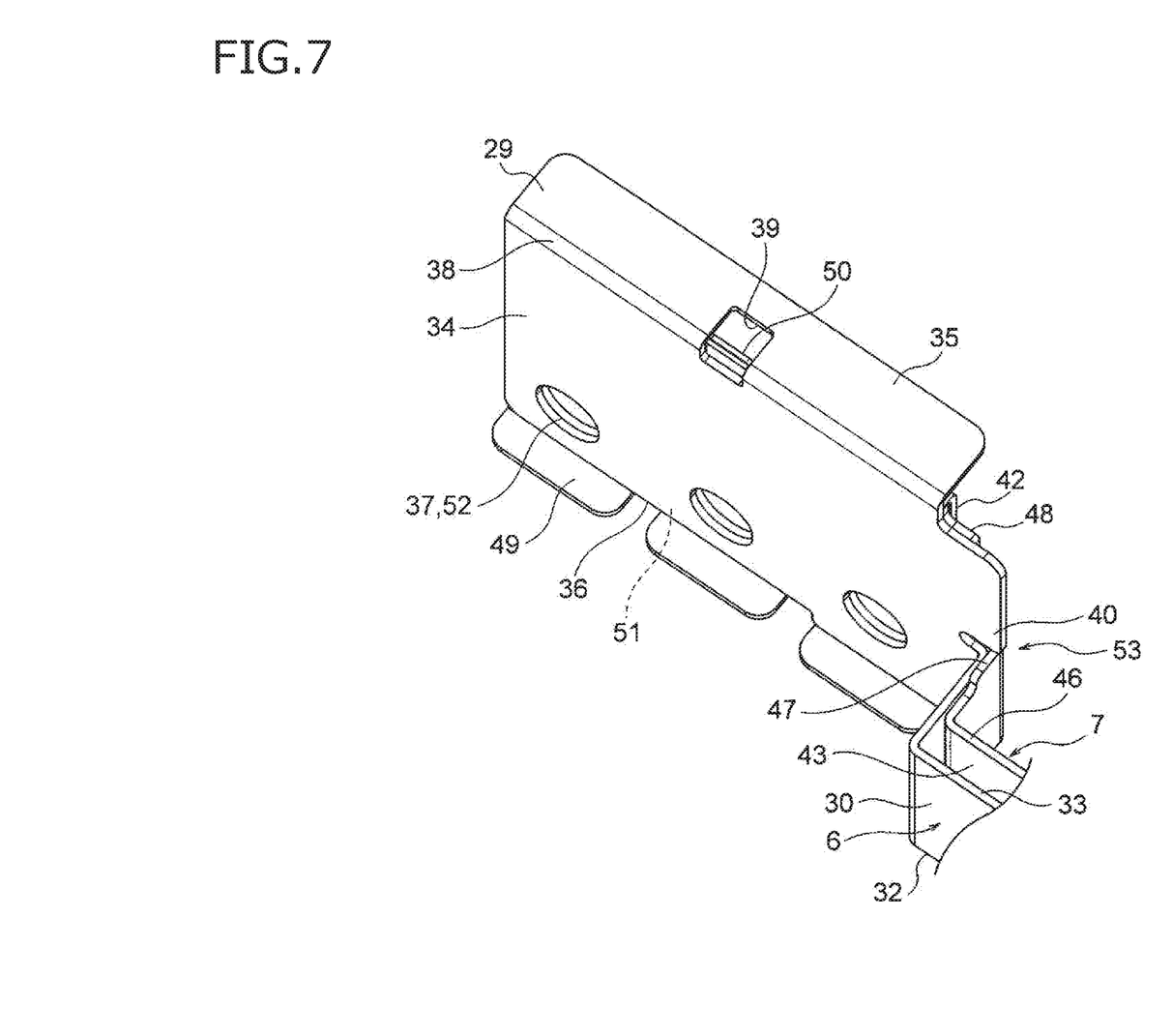
FIG. 7 is a perspective view showing the first bus bar and the second bus bar in FIG. 3.
Figure 8:
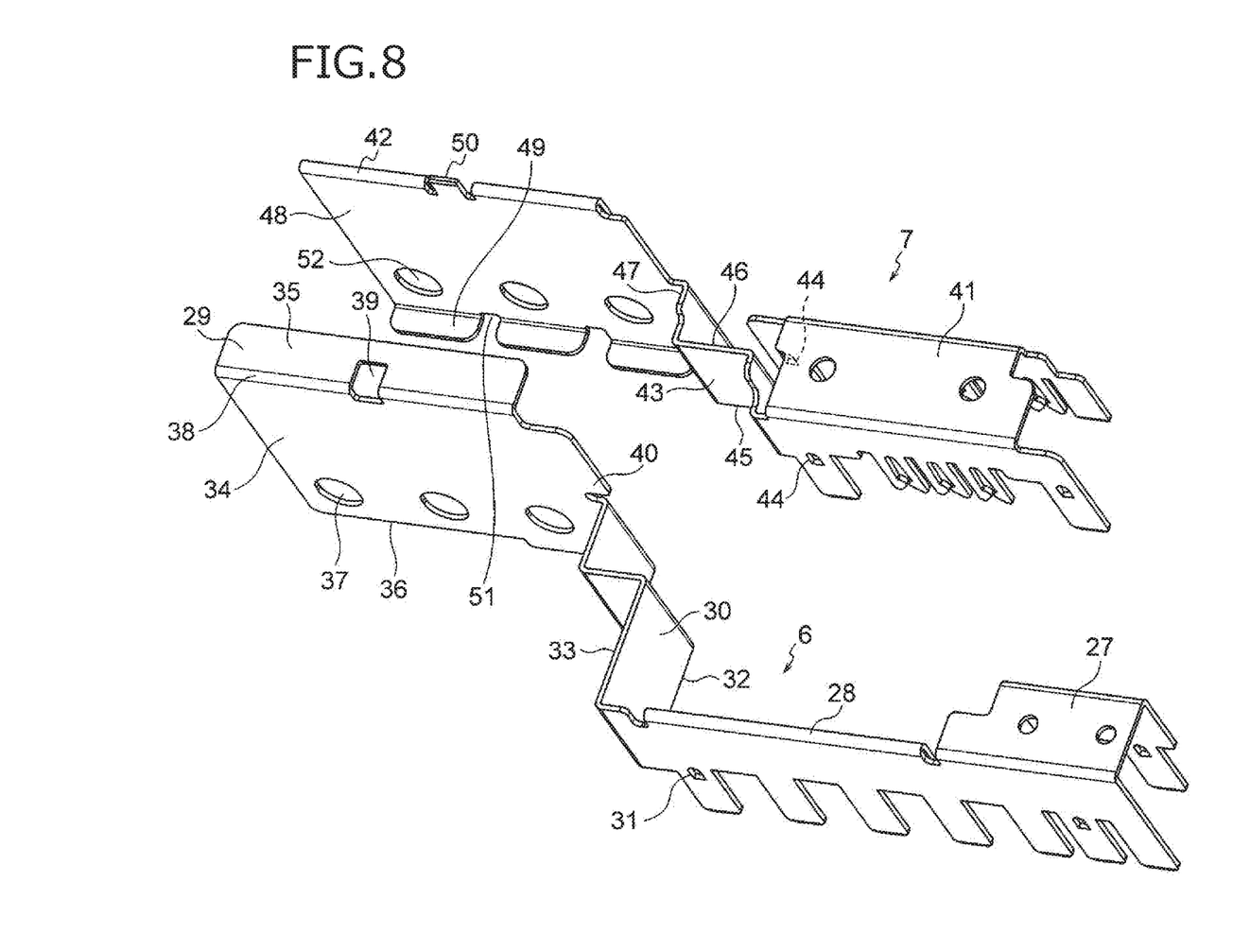
FIG. 8 is a perspective view showing the first bus bar and the second bus bar before assembling.

An embodiment will be described below with reference to the drawings. FIG. 1 is a perspective view showing an embodiment of an electronic component block having a bus bar holding structure according to the present invention. FIG. 2 is a perspective view showing a state in which a first bus bar and a second bus bar are assembled to a block main body. FIG. 3 is an exploded perspective view of a configuration in FIG. 2. FIG. 4 is a bottom view showing a bus bar accommodating groove. FIGS. 5 and 6 are bottom view and perspective views showing a main part of the bus bar holding structure. FIG. 7 is a perspective view showing the first bus bar and the second bus bar in FIG. 3. FIG. 8 is a perspective view showing the first bus bar and the second bus bar before assembling. In addition, arrows in FIGS. 1 to 3 denote an upper-lower direction.

<Configuration of Electrical Connection Box 1>

In FIG. 1, an electrical connection box 1 is mounted on a truck in a state of being exposed to outside (which is an example). Specifically, the electrical connection box 1 is mounted between a cabin and a loading platform of the truck (which is an example). Such an electrical connection box 1 includes an electronic component block 2 and a housing that accommodates the electronic component block 2. The electrical connection box 1 is disposed at a terminal of a wire harness. The terminal of the wire harness includes thick wires 3 and thin wires 4 drawn from a lower portion of the electrical connection box 1. The wire harness is routed at a predetermined position of the automobile with the electrical connection box.

<Electronic Component Block 2>

In FIGS. 1 to 3, plural types of electronic component blocks are assembled to the housing of the electrical connection box 1. One of the plural types of electronic component blocks is the electronic component block 2. The electronic component block 2 is provided in the electrical connection box 1 as a member to which a plurality of electronic components (for example, fuses or fusible links) is electrically attached. The electronic component block 2 is provided as a member in which the electronic components are connected to a predetermined circuit. The electronic component block 2 includes a block main body 5, a first bus bar 6, a second bus bar 7 and a third bus bar 8. The electronic component block 2 is formed such that the first bus bar 6 and the second bus bar 7 can be collectively assembled to the block main body 5. Since a characteristic portion of the present invention is not on a third bus bar 8 side, description of the third bus bar 8 will be omitted. The electronic component block 2 as described above is of a cassette type, and is detachably assembled to the housing. Regarding the electronic component block 2, these names may be replaced with a cassette block 2.

<Block Main Body 5>

In FIGS. 1 to 3, the block main body 5 is a resin molded article having insulating property. Cavities (reference numerals omitted) for the plurality of electronic components (not shown) are formed in the block main body 5. Three bus bar assembling portions 9 to 11 are formed in the block main body 5. The three bus bar assembling portions 9 to 11 are disposed and formed on a lower surface side of the block main body 5. The bus bar assembling portion 9 among the three bus bar assembling portions 9 to 11 is formed as an assembling portion of the first bus bar 6. The bus bar assembling portion 10 is formed as an assembling portion of the second bus bar 7. The bus bar assembling portion 11 is formed as an assembling portion of the third bus bar 8. Hereinafter, the bus bar assembling portions 9 and 10 will be described in more detail.

<Bus Bar Assembling Portion 9>

In FIGS. 1 to 3, the bus bar assembling portion 9 is formed as the assembling portion of the first bus bar 6 as described above. Such a bus bar assembling portion 9 is formed in an illustrated shape, and includes a first assembling portion 12, a second assembling portion 13 continuous with the first assembling portion 12, a third assembling portion 14, and a bus bar accommodating groove 15 connecting the second assembling portion 13 and the third assembling portion 14. The first assembling portion 12 is formed as an assembling portion of a first electrical connection portion 27 described below of the first bus bar 6. A holding portion 16 for the first electrical connection portion 27 is formed to protrude from the first assembling portion 12. The second assembling portion 13 is formed as an assembling portion of a second electrical connection portion 28 described below of the first bus bar 6. The third assembling portion 14 is disposed and formed on a connection side of the thick wires 3 and the thin wires 4. The third assembling portion 14 is formed as an assembling portion of a third electrical connection portion 29 described below of the first bus bar 6. The third assembling portion 14 is disposed and formed at the same position as a second assembling portion 18 described below of the bus bar assembling portion 10. The bus bar accommodating groove 15 is formed as an assembling portion of a bus bar main body 30 described below of the first bus bar 6. The bus bar accommodating groove 15 will be described below.

<Bus Bar Assembling Portion 10>

In FIGS. 1 to 3, the bus bar assembling portion 10 is formed as the assembling portion of the second bus bar 7 as described above. Such a bus bar assembling portion 10 is formed in an illustrated shape, and includes a first assembling portion 17, the second assembling portion 18, and a bus bar accommodating groove 19 connecting the first assembling portion 17 and the second assembling portion 18. The first assembling portion 17 is formed as an assembling portion of a first electrical connection portion 41 described below of the second bus bar 7. A holding portion 20 for the first electrical connection portion 41 is formed to protrude from the first assembling portion 17. The second assembling portion 18 is disposed and formed on the connection side of the thick wires 3 and the thin wires 4. The second assembling portion 18 is formed as an assembling portion of a second electrical connection portion 42 described below of the second bus bar 7. The bus bar accommodating groove 19 is formed as an assembling portion of a bus bar main body 43 described below of the second bus bar 7. The bus bar accommodating groove 19 will be described below.

<Bus Bar Accommodating Groove 15 and Bus Bar Accommodating Groove 19>

In FIGS. 4 to 6, the bus bar accommodating groove 15 and the bus bar accommodating groove 19 are formed in a groove shape as viewed from the lower surface side of the block main body 5. The bus bar accommodating groove 15 and the bus bar accommodating groove 19 are formed in the groove shape having a groove portion having a bottom, an opening of the groove portion and a side wall of the groove portion without any particular reference numeral. The bus bar accommodating groove 15 and the bus bar accommodating groove 19 are formed in an illustrated shape, and respectively include a groove shallow portion 21 and a groove deep portion 22. The groove deep portion 22 is formed wide so as to be a common portion of the bus bar accommodating groove 15 and the bus bar accommodating groove 19. A bus bar locking portion 23 is formed in such a groove deep portion 22. The bus bar locking portion 23 is formed as a portion that locks the bus bar main body 30 described below of the first bus bar 6. The bus bar locking portion 23 is formed in a so-called lance shape. The bus bar locking portion 23 is disposed in alignment with a position in vicinity of a protruding portion 40 described below of the first bus bar 6.

In FIG. 4, the bus bar accommodating groove 15 and the bus bar accommodating groove 19 are formed such that a continuous portion of the groove shallow portions 21 and the groove deep portion 22 is bent by 90 degrees. The groove deep portion 22 is formed such that a continuous portion of the third assembling portion 14 and the second assembling portion 18 is bent by 90 degrees.

<Other Portions>

In FIG. 4, reference numeral 24 denotes a bus bar locking portion that locks the second electrical connection portion 28 described below of the first bus bar 6. Reference numerals 25 and 26 denote bus bar locking portions that lock the first electrical connection portion 41 described below of the second bus bar 7. As can be seen from the drawing, no portion is provided to lock the second bus bar 7 from the bus bar accommodating groove 19 to the second assembling portion 18, that is, no bus bar locking portion is provided therein (a bus bar locking portion is difficult to be formed in terms of space).

<First Bus Bar 6>

In FIGS. 3, 7 and 8, the first bus bar 6 is formed by pressing a conductive metal plate. The first bus bar 6 is formed in an illustrated shape, and includes the first electrical connection portion 27, the second electrical connection portion 28 continuous with the first electrical connection portion 27, the third electrical connection portion 29, and the bus bar main body 30 connecting the second electrical connection portion 28 and the third electrical connection portion 29. A locking hole 31 that is locked to the bus bar locking portion 24 (see FIG. 4) is formed in the second electrical connection portion 28. The bus bar main body 30 is formed in a strip shape. Reference numeral 32 in the bus bar main body 30 denotes "first side portion". First side portion 32 is accommodated in the bus bar accommodating groove 15 (see FIG. 4) on a bottom side of a groove portion. In addition, reference numeral 33 in the bus bar main body 30 denotes "the second side portion". The second side portion 33 is accommodated in the bus bar accommodating groove 15 on a groove opening side. The bus bar main body 30 is formed in a shape bent several times by 90 degrees in a longitudinal direction. In the second side portion 33, the vicinity of the protruding portion 40 described below is a portion that is locked to the bus bar locking portion 23 (see FIGS. 4 to 6). Locking of the bus bar locking portion 23 does not cause rattling of the third electrical connection portion 29.

The third electrical connection portion 29 is formed in a plate-shaped portion wider than the bus bar main body 30. A main body 34 and a first pushing portion 35 are formed in the third electrical connection portion 29. Three through holes 37 are formed on a side of a first side portion 36 of the main body 34. The through hole 37 is formed for inserting a bolt (not shown) used for connecting the thick wires 3 and the thin wires 4 (see FIG. 1). The first pushing portion 35 is coupled to the second side portion 38 of the main body 34. The first pushing portion 35 is formed of a strip-shaped bent piece extending along the second side portion 38. The first pushing portion 35 is formed by bending by 90 degrees. A through hole 39 is formed in such a first pushing portion 35. The through hole 39 is formed in a portion of the second bus bar 7 with respect to a second pushing portion 50 described below.

<Protruding Portion 40>

In FIGS. 3, 7 and 8, the protruding portion 40 is formed in a continuous portion of the third electrical connection portion 29 and the bus bar main body 30. The protruding portion 40 is formed so as to extend straight from an end part of the main body 34 along an extending direction of the first side portion 36 of the third electrical connection portion 29. A shape extending straight is used to increase the surface area to enhance heat dissipation. The protruding portion 40 also functions as a heat dissipating portion in addition to functions described below. As shown in FIGS. 5 and 6, the protruding portion 40 is formed in such a portion as to sandwich the second bus bar 7 with a bottom of the groove portion of the bar accommodating groove 15 and the bus bar accommodating groove 19. That is, the protruding portion 40 is formed in a portion that prevents rattling of the second bus bar 7. The protruding portion 40 functions as a bus bar locking portion with respect to the second bus bar 7. Rattling does not occur when the protruding portion 40 is in contact with the second bus bar 7, and can be at most prevented by a clearance between the protruding portion 40 and the second bus bar 7. Even if rattling occurs while the clearance is provided, the amount is very small.

As described above, the protruding portion 40 is formed in the portion that prevents rattling of the second bus bar 7. Similarly, the third electrical connection portion 29 can also prevent the rattling of the second bus bar 7. That is, the first side portion 36 of the main body 34 in the third electrical connection portion 29 is formed in such a portion as to sandwich bent pieces 49 described below of the second bus bar 7 with the bottom of the groove portion. Therefore, rattling can be prevented at two places (doubly).

<Second Bus Bar 7>

In FIGS. 3, 7 and 8, the second bus bar 7 is formed by pressing a metal plate having the same conductivity as the first bus bar 6. The second bus bar 7 is a bus bar that may cause rattling when being as a destination to which a structure in related art is assembled. The second bus bar 7 is formed in an illustrated shape, and includes the first electrical connection portion 41, the second electrical connection portion 42, and the bus bar main body 43 connecting the first electrical connection portion 41 and the second electrical connection portion 42. Locking holes 44 that are locked to the bus bar locking portions 25 and 26 are formed (see FIG. 4) in the first electrical connection portion 41. The bus bar main body 43 is formed in a strip shape. Reference numeral 45 in the bus bar main body 43 denotes "first side portion". First side portion 45 is accommodated in the bus bar accommodating groove 19 (see FIG. 4) on a bottom side of the groove portion. In addition, reference numeral 46 in the bus bar main body 43 denotes "the second side portion". The second side portion 46 is accommodated in the bus bar accommodating groove 19 on a groove opening side. The bus bar main body 43 is formed in a shape bent several times by 90 degrees in the longitudinal direction. Reference numeral 47 in the second side portion 46 denotes a locked portion with respect to the protruding portion 40. Since the bus bar main body 43 is sandwiched between the protruding portion 40 and the bottom of the groove portion at a position of the locked portion 47, rattling of the second electrical connection portion 42 does not occur.

The second electrical connection portion 42 is formed in a plate-shaped portion wider than the bus bar main body 43. A main body 48, the bent pieces 49 and the second pushing portion 50 are formed in the second electrical connection portion 42. Three through holes 52 and three bent pieces 49 are formed on a side of a first side portion 51 of the main body 48. The through hole 52 is formed for inserting a bolt (not shown) used for connecting the thick wires 3 and the thin wires 4 (see FIG. 1). The second pushing portion 50 is formed in a narrow protruding piece shape. The second pushing portion 50 is inserted into the through hole 39 of the first pushing portion 35 in the first bus bar 6. A protruding tip end of the second pushing portion 50 is formed in alignment with a position of a pushed surface (an outer surface) of the first pushing portion 35.

<Assembling of Electrical Component Block 2>

In FIG. 3, first, the first bus bar 6 and the second bus bar 7 are assembled such that the main body 34 of the third electrical connection portion 29 in the first bus bar 6 and the main body 48 of the second electrical connection portion 42 in the second bus bar 7 are overlapped with each other. Next, when the first bus bar 6 and the second bus bar 7 are collectively pushed into the bus bar assembling portions 9 and 10 of the block main body 5 as shown in FIG. 2, assembling of the first bus bar 6 and the second bus bar 7 is completed. A surface pushing jig (not shown) is used during the collective pushing of the first bus bar 6 and the second bus bar 7. The surface pushing jig (not shown) is configured to simultaneously push the first electrical connection portion 27 and the first pushing portion 35 of the first bus bar 6, as well as the first electrical connection portion 41, the second electrical connection portion 42 and the second pushing portion 50 of the second bus bar 7. Therefore, the workability is higher than assembling the first bus bar 6 and the second bus bar 7 one by one. The first bus bar 6 and the second bus bar 7 assembled to the bus bar assembling portions 9 and 10 are in a state in which rattling is prevented. Particularly with regard to the second bus bar 7, even if a dedicated bus bar locking portion for the second electrical connection portion 42 and the bus bar main body 43 cannot be obtained due to space relationship, the protruding portion 40 of the first bus bar 6 and the bottom of the groove portion sandwich at the portion of the locked portion 47 of the bus bar main body 43 as shown in FIGS. 5 and 6, so that no rattling occurs in the second electrical connection portion 42. In other words, the second bus bar 7 is in a state in which rattling is prevented. The state in which rattling of the second bus bar 7 is prevented is due to a bus bar holding structure 53 configured and structured as described above.

Effects

As described above with reference to FIGS. 1 to 8, according to the bus bar holding structure 53 of the embodiment of the present invention, the second bus bar 7 that may cause rattling is sandwiched between the protruding portion 40 of the first bus bar 6 and the bottom of the bus bar accommodating groove 19, so that rattling of the second bus bar 7 can be prevented. According to the electrical connection box 1 or the wire harness of the embodiment of the present invention, a better product can be provided due to the bus bar holding structure 53 having the above effect.

It goes without saying that the present invention can be variously modified without departing from the spirit of the present invention.

What is claimed is:

1. A bus bar holding structure comprising:
   a resin block main body for an electronic component block;
   a first bus bar having a protruding portion; and
   a second bus bar,
   wherein the resin block main body includes a bus bar assembling portion having a groove portion;
   wherein the first bus bar and the second bus bar are accommodated in the bus bar assembling portion such that first side portions of the first bus bar and the second bus bar are located on a bottom side of the groove portion and second side portions of the first bus bar and the second bus bar are located on an opening side of the groove portion; and
   wherein the second bus bar is sandwiched between the protruding portion of the first bus bar and a bottom of the groove portion when the first bus bar and the second bus bar are accommodated in the bus bar assembling portion; and
   wherein the protruding portion extends toward the opening of the groove portion.

2. The bus bar holding structure according to claim 1,
   wherein a bus bar locking portion that locks the second side portion of the first bus bar is provided on the bus bar assembling portion; and
   wherein the bus bar locking portion is disposed in a vicinity of the protruding portion.

3. An electrical connection box comprising:
an electronic component block that includes the bus bar holding structure according to claim 1; and
a housing that accommodates the electronic component block.

4. A wire harness comprising:
a wire harness body whose end portion is connected to the electrical connection box according to claim 3,
wherein the wire harness body is routed in an automobile.

* * * * *